United States Patent [19]
Oki et al.

[11] Patent Number: 5,454,049
[45] Date of Patent: Sep. 26, 1995

[54] AUTOMATIC THRESHOLD FUNCTION FOR MACHINE VISION

[75] Inventors: Toru Oki, Allendale; Marcel M. Lissinna, Scotch Plains, both of N.J.

[73] Assignee: Sony Electronics, Inc., Park Ridge, N.J.

[21] Appl. No.: 80,406

[22] Filed: Jun. 21, 1993

[51] Int. Cl.⁶ ..................................................... G06K 9/38
[52] U.S. Cl. ........................... 382/172; 382/141; 382/272
[58] Field of Search .................................. 382/50, 51, 52, 382/8, 18; 358/465, 460

[56] References Cited

U.S. PATENT DOCUMENTS

| | | | |
|---|---|---|---|
| 4,675,909 | 6/1987 | Gyami et al. | 382/51 |
| 4,809,349 | 2/1989 | Henby et al. | 382/50 |
| 4,908,875 | 3/1990 | Assad et al. | 382/52 |
| 4,963,036 | 10/1990 | Drisko et al. | 382/50 |
| 5,081,690 | 1/1992 | Tan | 382/50 |
| 5,091,965 | 2/1992 | Kobayashi et al. | 382/15 |

*Primary Examiner*—Joseph Mancuso
*Attorney, Agent, or Firm*—William S. Frommer; Alvin Sinderbrand

[57] ABSTRACT

In a machine vision system, a pixel-discrimination threshold level, for determining whether pixels are to be assigned one or the other of two values, is established according to parameters obtained in an initialization procedure. During initialization, a test set of items is assembled and data is entered representing indicia appearing on each item of the test set. It is then determined, for each of a range of possible threshold levels, whether the machine vision system correctly recognizes the indicia on the respective test items. Based on the thresholds which permitted correct recognition, threshold parameters are calculated for each test item and average parameters are calculated from the test item parameters. The average parameters are used to set pixel-discrimination thresholds for subsequent recognition operations.

34 Claims, 7 Drawing Sheets

AUTOMATIC THRESHOLD FUNCTION FOR MACHINE VISION

FIELD OF THE INVENTION

This invention relates to machine vision systems, and more particularly, to such systems in which binary values are assigned to pixels.

BACKGROUND OF THE INVENTION

It is common in machine vision systems to perform a binary classification of pixels in an image to be analyzed; in other words, one of the values "0" and "1" is assigned to each pixel. Analysis of the image then proceeds on the basis of the binary classification of the pixels.

Since the information making up the image to be analyzed is often presented to the system in non-binary form, such as gray-scale levels, selection of a threshold for binary classification (a "pixel-discrimination threshold") is a fundamental task that must be performed before the analysis of the image. Moreover, it has been found in some machine vision systems, particularly those in which character recognition is to be performed, that the accuracy of the analysis and/or the amount of time required is dependent upon the threshold selected.

An application of machine vision in which setting of a pixel-discrimination threshold has been found to be critical is the automatic recognition of identification codes on semiconductor wafers. The recognition may be performed, for example, for the purpose of sorting or production control, record keeping and the like. FIG. 1 is an illustration of a typical semiconductor wafer, generally indicated by reference numeral 10. The semiconductor wafer 10 is generally planar, and circular in outline except for an indentation in the shape of a segment defined by a straight line edge 12. A multi-character identification code 14 is formed in a surface 16 of semiconductor wafer 10. The characters making up the i.d. code 14 may be formed by laser-etching or a similar process and are arranged in a character line that runs parallel to, and a short distance from, edge 12. The size of the characters as shown in FIG. 1 is not necessarily to scale; in a typical semiconductor wafer 10, the characters may be only a few millimeters high. Further, as will be recognized by those skilled in the art, the surface 16 of semiconductor wafer 10 may have been coated with a metal film or other coating that renders the surface 16 highly reflective. Moreover, although in the illustration the characters are shown as black-on-white, it should be understood that in practice the characters may be evidenced only by impressions in the surface 16, so that there is not a great contrast in tone between the characters of i.d. code 14 and the balance of surface 16.

Adding to the difficulties presented in accomplishing accurate and rapid machine recognition of the i.d. code 14 is the fact that a sequence of wafers bearing i.d. codes to be recognized may include wafers that vary significantly in reflectivity and color.

In setting up a machine vision system for recognition of i.d. code characters, it is often found to be useful to program or otherwise prepare the system to recognize characters having character lines of a predetermined thickness. However, it has been found that the particular pixel-discrimination threshold level used by a machine vision system can have a significant effect on the thickness of the character lines resulting from the binary classification of the pixels. The variations in thickness, in turn, can have a significant adverse effect on one or both of the accuracy of the character recognition and the time required therefor.

OBJECTS AND SUMMARY OF THE INVENTION

Accordingly, it is an object of the present invention to provide a method of operating a machine vision system in which an appropriate pixel-discrimination threshold level is automatically established for each item presented for recognition to the machine vision system.

In accordance with the invention, a method of setting a pixel-discrimination threshold level for a machine vision system adapted to recognize indicia on a work-piece includes setting a plurality of test threshold levels for each work-piece of a test group of work-pieces and using the plural test threshold levels to recognize indicia on a work-piece; determining if the plural test threshold levels result in acceptable indicia recognition; calculating at least one threshold-setting parameter on the basis of the results of the determinations; and establishing a pixel-discrimination threshold level for each work-piece not included in the test group on the basis of a characteristic of an image of the work-piece not included in the test group and the threshold setting parameter or parameters.

According to a further aspect of the invention, a threshold-setting parameter is calculated on the basis of an estimated average number of pixels which represent the indicia to be recognized.

According to still another aspect of the invention, a threshold-setting parameter is calculated on the basis of an estimated average gray-scale level of the estimated average number of pixels.

According to another aspect of the invention, a method of setting a pixel-discrimination threshold level for a machine vision system includes the steps of selecting a test group of work-pieces, each of which has an indicia to be recognized by the machine vision system; establishing a range of gray-scale levels as test threshold levels; and, for each work-piece of the test group, forming an image of at least a portion of the work-piece so that the image includes a representation of the indicia and has a plurality of gray-scale levels, attempting to recognize the indicia by means of the vision system using each of the test threshold levels as a pixel-discrimination threshold for the image, entering into the system data representing the actual indicia of the work-piece, determining for each test threshold level whether the system correctly recognized the indicia on the work-piece, establishing a subrange of test threshold levels that includes only those test threshold levels at which the system correctly recognized the indicia, selecting a central threshold level of the subrange as an ideal threshold level for the work-piece, and calculating a piece parameter on the basis of the ideal threshold level. The method further includes calculating a threshold-setting parameter on the basis of the piece parameters.

According to a further aspect of the invention, the method also includes the steps of selecting a work-piece not included in the test group and which has an indicia to be recognized by the vision system; forming an image of a portion of the selected work-piece including a representation of the indicia and having a plurality of gray-scale levels; taking a histogram of the image, where the histogram includes a representation of a respective number of pixels for each gray-scale level of the image; and setting a pixel-discrimination threshold for the work-piece not included in the test group on the basis of the histogram and the threshold-setting parameter.

By using the methods described above, a satisfactory pixel-discrimination threshold can be automatically established for each item to be recognized on the basis of a relatively small quantity of data gathered during a brief initialization process.

The above, and other objects, features and advantages of the present invention will be apparent from the following detailed description thereof which is to be read in connection with the accompanying drawings.

DETAILED DESCRIPTION OF THE PREFERRED EMBODIMENTS

A machine vision system, and a method of setting pixel-discrimination threshold levels for the same, in accordance with the invention, will now be described with reference first to FIG. 2.

Figure 1:
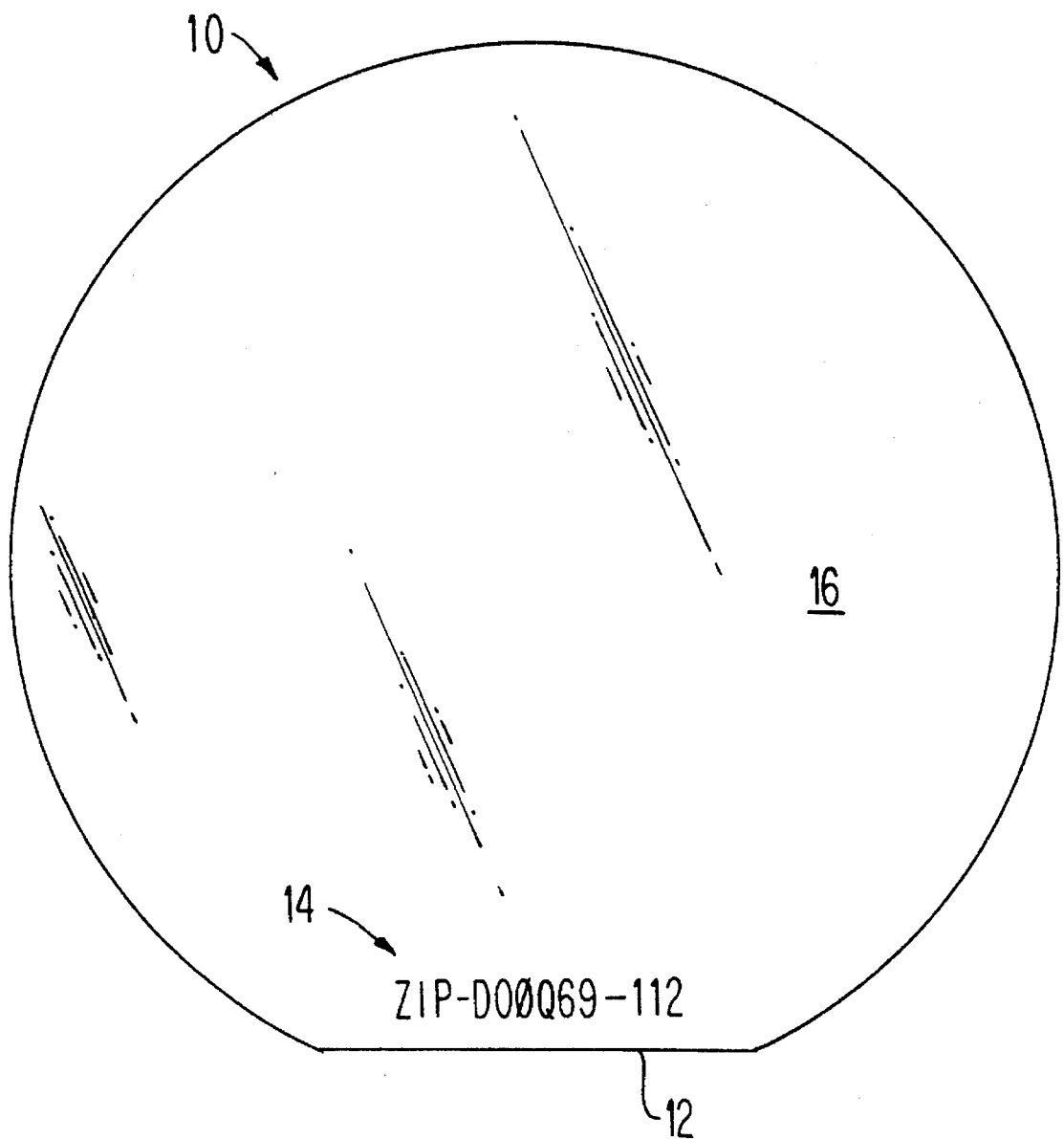
FIG. 1 is a plan view of a semiconductor wafer which includes an identification code that is to be machine-recognized.
Figure 2:
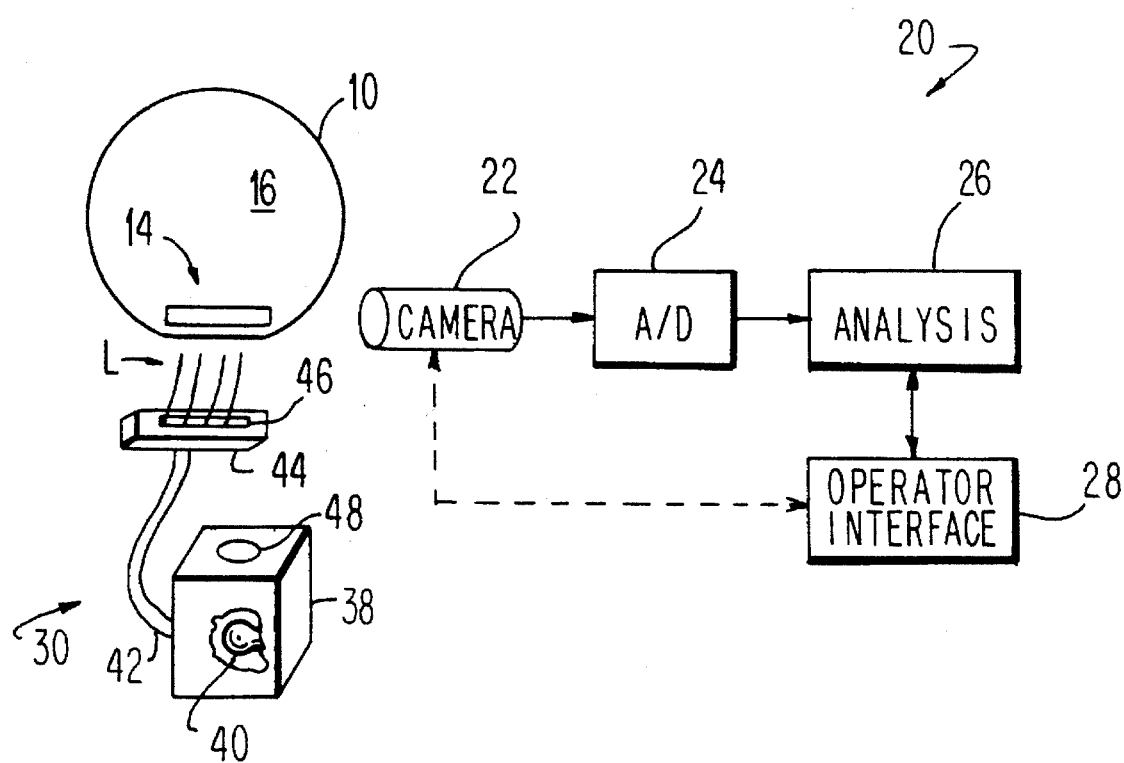
FIG. 2 is a partial schematic, partial block diagram of a machine vision system in accordance with the present invention.

In FIG. 2, reference numeral 20 generally indicates a machine vision system which includes a camera 22, an analog-to-digital converter 24, an analysis module 26 for carrying out character recognition, and an operator interface 28. A lighting device 30 is associated with machine vision system 20 and provides light L for illuminating at least the portion of semiconductor wafer 10 which includes the identification code 14. (Although in FIG. 2, for reasons of scale, identification code 14 is represented only by a rectangular box, it should be understood that the identification code is actually in the form of a character string etched in the surface of semiconductor wafer 10 as shown and described in connection with FIG. 1.)

Light incident upon the identification code 14 is received by camera 22 and used by camera 22 to form a gray-scale image of a portion of the surface 16 of wafer 10 which includes the identification code 14. Camera 22 is preferably a conventional video camera or other well-known image-forming device and may be, for example, the model XC77 camera produced by Sony Corporation.

Figure 3:
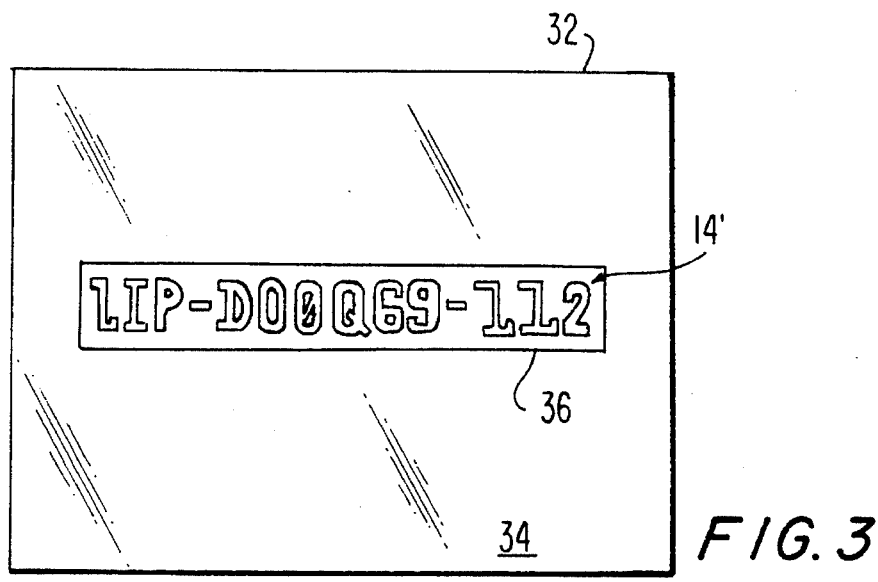
FIG. 3 is an image formed by the machine vision system of FIG. 2 and including a representation of the i.d. code of the semiconductor wafer of FIG. 1.

FIG. 3 is a representation of an image 32 formed by camera 22. The image 32 includes a substantially gray background area 34 and a representation 14' of the identification code 14. Although the representation 14' is shown in FIG. 3 in the form of an outline of the represented characters of the i.d. code 14, it should be noted that in the image itself the characters appear as white, or relatively light in tone, against the gray background 34. Image 32 also includes a rectangular frame 36 in the form of black lines defining a relatively small portion of the gray background 34 that includes all of the represented characters of representation 14'.

Camera 22 provides to A/D converter 24 analog signals representative of respective gray-scale levels of individual pixels of image 32. These signals are converted into digital data on a pixel-by-pixel basis by A/D converter 24, and the resulting data is provided for analysis and character recognition to analysis module 26. In a preferred embodiment of the invention, only the portion of image 32 within frame 36 is analyzed by analysis module 26 for the purpose of character recognition, the area within frame 36 contains an array of approximately 100×400 pixels so that about 40,000 pixels are in the part of the image 32 that is to be analyzed, and 128 grayscale levels are possible (i.e. each pixel is represented by a seven-bit data word).

Analysis module 26 may be a known type of electronic character recognition device, including a microprocessor and associated memory and data communication devices, and operating under control of a known type of character recognition software. It is also within the contemplation of this invention that analysis module 26 use neural network recognition technology of the type disclosed in co-pending U.S. patent applications Ser. Nos. 07/955,522; 07/955,526; 07/955,534; 07/955,555; and 07/955,563; all of which have a common assignee and a common inventor with the present application.

Operator interface 28 is connected for data communication with analysis module 26 and preferably includes conventional input/output devices such as a computer display monitor and keyboard. For example, operator interface 28 may include a conventional personal computer. Operator interface 28 may also be directly connected to camera 22 for receiving and displaying images formed by camera 22 and/or for making adjustments to settings of camera 22.

As is conventional with known types of character recognition equipment, analysis module 26 converts the pixel-by-pixel gray-scale data received from an A/D convertor 24 into a binary representation of the pixels within frame 36. In other words, each pixel is assigned either "0" or "1" representing respectively "black" or "white" (or vice versa). The analysis module 26 then attempts to recognize the characters represented by the representation 14' on the basis of the binarized pixel data. In a preferred embodiment of the present invention, the 128 possible values for the gray scale that may be output by A/D converter 24 have identifying data values 0–127. One of the values in this range is used by analysis module 26 as a threshold for the binary classification of the pixels. This value, as indicated above, will be referred to as the "pixel-discrimination threshold".

Lighting device 30 includes a box 38 enclosing a lamp 40. Light emitted by the lamp 40 is carried by an optical fiber tube 42 to a head 44 which includes a slit 46. The optical fiber tube 42 is flexible, allowing head 44 to be positioned so that light L emanating from slit 46 provides illumination of the i.d. code 14 on the wafer 10. Box 38 preferably includes a dimmer switch 48 which allows the level of light L to be conveniently adjusted.

Figure 4A:
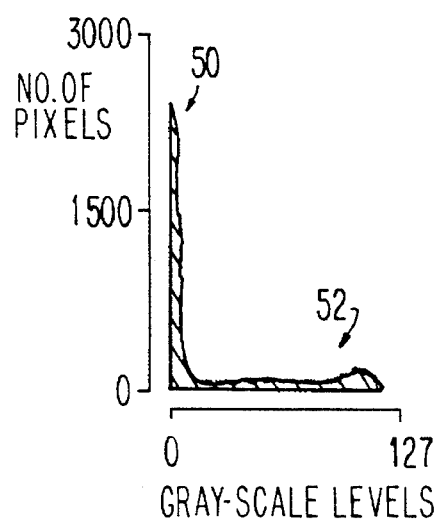
FIGS. 4A–4C are histograms taken of images of the sort shown in FIG. 3.
Figure 4B:
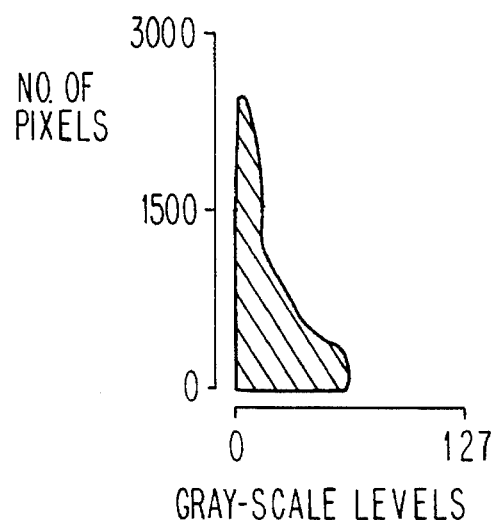
Figure 4C:
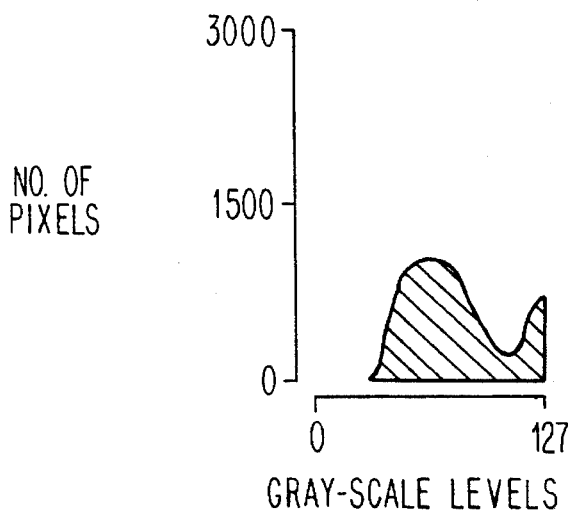
Figure 7:
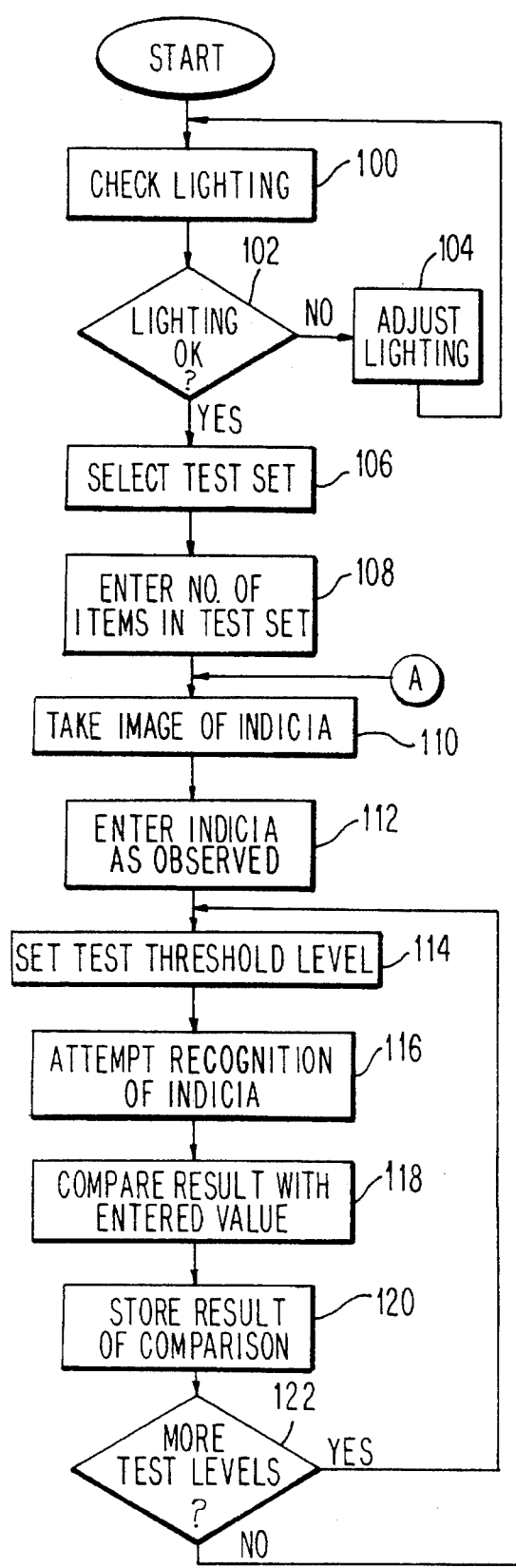
FIG. 7 is a flow chart of an initialization procedure for a machine vision system in accordance with the present invention.
Figure 7:
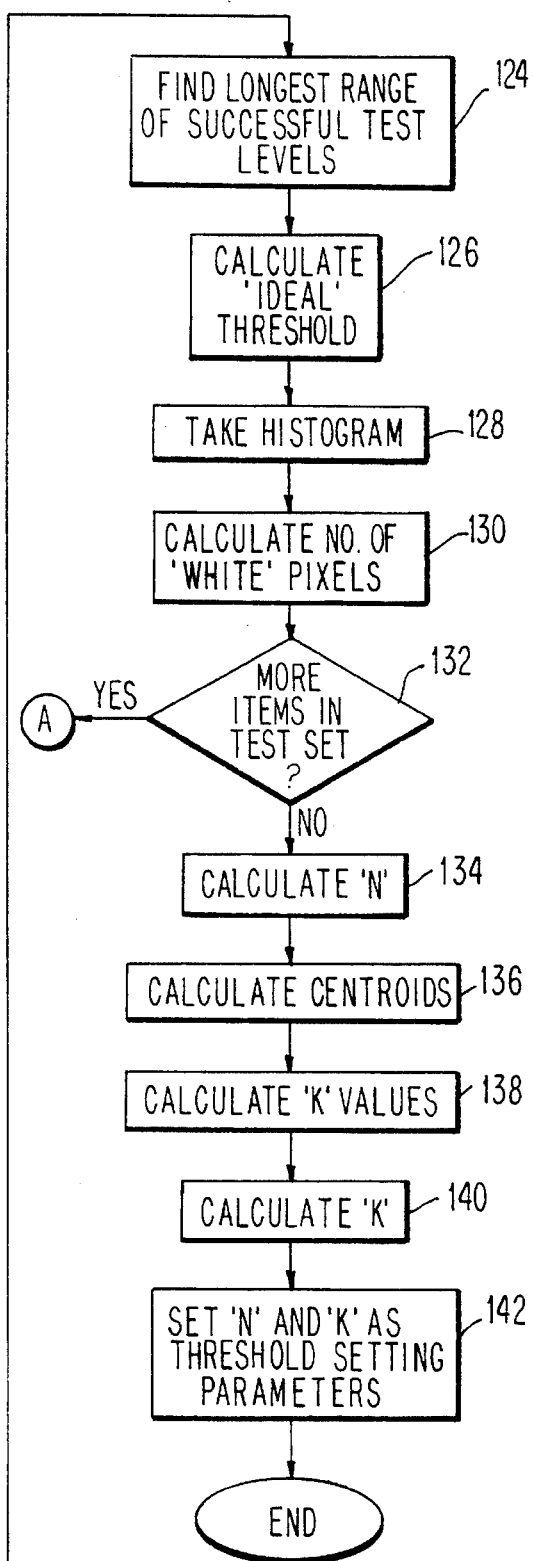

An initialization procedure for selection of the pixel-discrimination threshold will now be described with reference to FIGS. 4–7. Referring initially to FIG. 7, the initialization procedure preferably begins with a determination whether an appropriate level of light L is being provided by the lighting device 30. At step 100, one or two work-pieces (i.e., semiconductor wafers) are selected. It is advisable that these wafers be among those which appear to have the greatest reflectivity. For each of the wafers an image 32 (like that shown in FIG. 3) is formed and the portion of the image within the frame 36 is analyzed to produce histograms of the types shown in FIGS. 4A–4C. Each histogram represents, for each of the 128 gray-scale levels, the number of pixels within frame 36 having that gray-scale level. Step 102 represents a decision by the operator, based on the histogram, as to whether the lighting level is satisfactory. If the histograms have the form shown in FIG. 4A, with a relatively sharp "peak" 50 toward the lower (darker) values and a rather long narrow "tail" 52 that stops short of the highest (lightest) value 127, then the lighting level is considered to be satisfactory. However, if a histogram like that shown in FIG. 4B is produced, lacking a "tail" then the lighting level is too dark, and meaningful threshold information will be difficult to generate. Even greater difficulties are presented by a histogram of the type shown in FIG. 4C in which a substantial number of pixels are at the highest (lightest) gray-scale level. This condition is known as "over-saturation" and will result in unreliable pixel-discrimination threshold data. If histograms of the sort shown in FIGS. 4B or 4C are found to be present at step 102, then the lighting level should be adjusted (step 104) and steps 100 and 102 repeated. It should be understood that if over-saturation (FIG. 4C) is found, than the lighting level should be adjusted downward while if an excessively dark image (FIG. 4B) is found, then the lighting level should be adjusted upward.

If at step 102 the lighting level was found to be satisfactory, step 106 follows, at which a test set of wafers is selected. A test set of 10 to 15 wafers has been found to be satisfactory, but it is advisable to have the wafers in the test set as representative as possible of the variations in reflectivity and color of the wafers that will be processed for recognition after initialization. After selection of the test set, operation of the machine vision system in an initialization mode begins with entry (preferably in response to a system prompt) of the number of items in the selected test step (step 108). Next, for a first wafer in the test set, an image 32 (like that shown in FIG. 3) is formed (step 110), and the operator then enters into the system 20, via operator interface 28, data which represents the identification code 14 as observed by the operator (step 112). That data may be, simply, the identification code itself as displayed in the image 32. There then follows a loop in which the system 20 attempts to recognize the identification code 14 while using, in turn, each of the 128 gray-scale levels 0–127 as a pixel-discrimination level. More specifically, at step 114 a test threshold level (initially, for example, level "0") is set as the test threshold level. Step 116 follows, at which the system attempts to recognize the i.d. code 14 using the test threshold level as the pixel-discrimination threshold. The loop proceeds next to step 118 at which the system 20 compares the i.d. code as recognized at step 116 with the i.d. code as entered by the operator at step 112. If the two i.d. codes match then the recognition is considered to be "successful"; if not, the recognition is considered "not successful". In either case, the result ("S" or "N" as the case may be) is stored with respect to the present test threshold level (step 120). Next, it is determined whether there remain additional test threshold levels to be tested (step 122). If so, the test threshold level is incremented (step 114) and the loop repeats until all of the 128 gray-scale levels have been used as a pixel-discrimination threshold level for the wafer currently being tested.

Figure 5A:
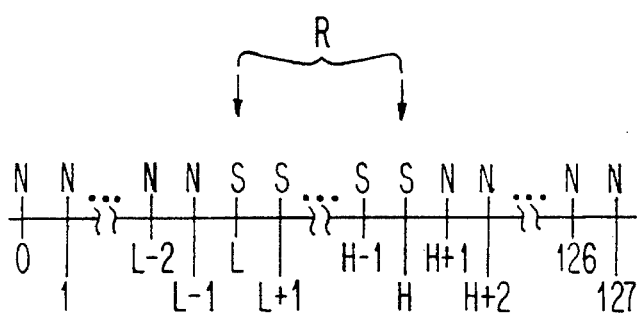
FIGS. 5A and 5B are diagrams that illustrate results of pixel-discrimination threshold testing procedures in accordance with the present invention.

The routine then proceeds to step 124, at which, on the basis of the results of the 128 attempted recognitions and comparisons, the system determines the gray-scale levels making up the longest range of levels for which "successful" recognition is found. Further details of this step will be explained with reference to FIGS. 5A and 5B. Typically it has been found that when the "darkest" gray-scale levels are used as a pixel-discrimination level the recognition is not successful. Then, in an intermediate range of gray-scale levels, the recognition is successful, and then using the lightest gray-scale levels as the discrimination threshold, the recognition is again not successful. Accordingly, the entire range of levels 0–127 may be viewed as seen in FIG. 5A in which the level "L" is the lowest gray-scale level at which recognition was successfully performed, and the level "H" is the highest gray-scale level for which recognition was successful. Thus there is a range R, defined by the two arrows in FIG. 5A and inclusive of the gray-scale levels "L" and "H" in which the recognition was successful, the recognition not being successful at any of the other levels.

Figure 5B:
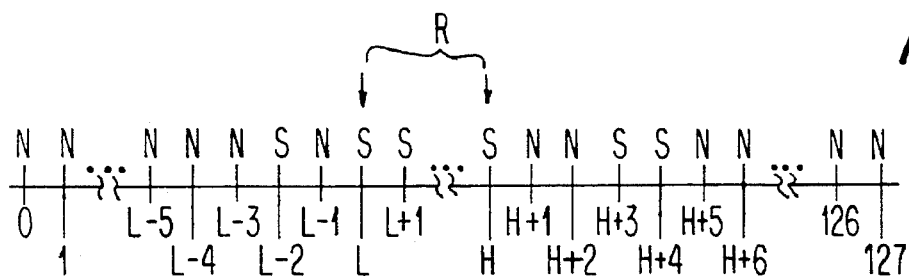
Figure 6A:
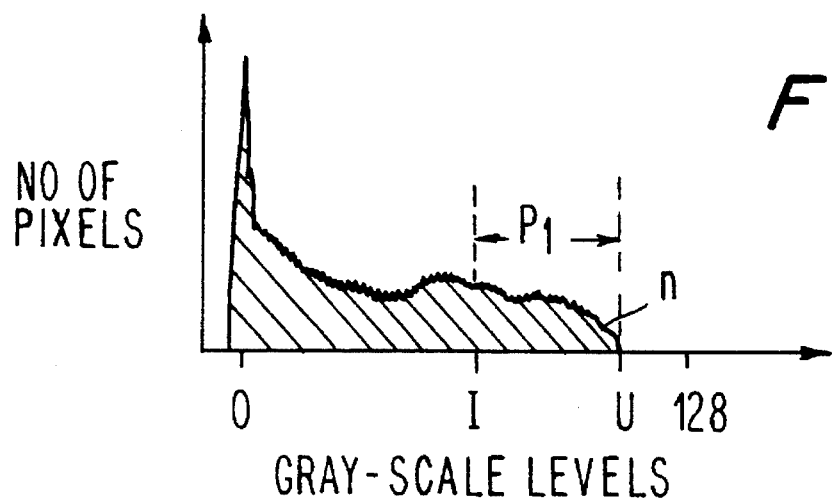
FIGS. 6A and 6B illustrate analyses of histograms performed in accordance with the present invention.
Figure 6B:
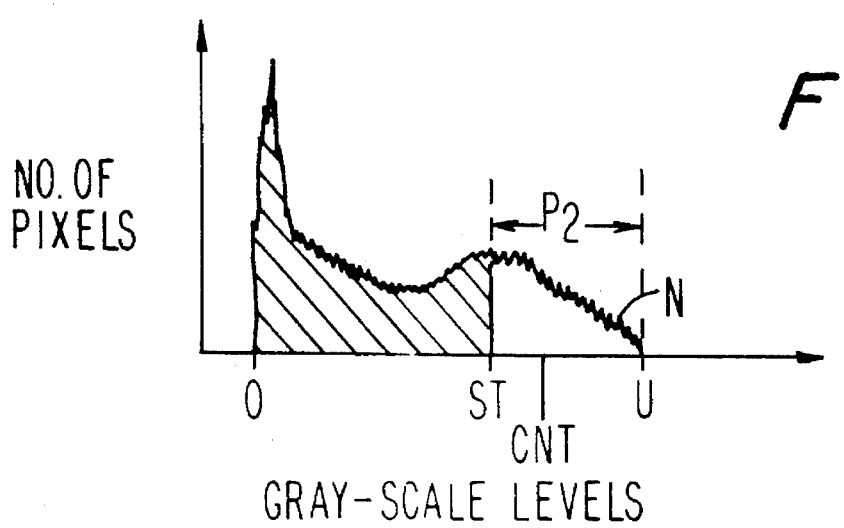

However, another possibility is that some "successful" test threshold levels may be interspersed among "not successful" levels. Such a case is illustrated in FIG. 5B. In this case, the range R, as defined by the two arrows, includes only "S" gray-scale levels, but there are some "S" levels outside of the range R. To deal with this possibility, range R should be defined as the longest run of consecutive "successful" gray-scale test threshold levels, with the lowest and highest of the levels in this range respectively selected to be "L" and "H". Of course, application of these rules to the situation shown in FIG. 5A would not change the gray-scale levels to be identified as "L" and "H" as shown in FIG. 5A.

The routine then proceeds to step 126, at which an "ideal" threshold level I is calculated for the particular wafer being tested on the basis of levels L and H. Level I preferably is the central level of the "successful" range R and may be obtained simply by averaging L and H. Thus, the ideal threshold level can be defined as:

$$I=(L+H)/2$$

If necessary, the resulting value is to be rounded up or down so that I is an integer.

The procedure then continues with step 128, at which the vision system 20 forms a histogram of the image formed at step 110. (Alternatively, it is possible to take the histogram immediately after the image was formed at step 110 or at another point between steps 110 and 128). As before, the histogram represents the number of pixels in the image frame 36 for each of the 128 gray-scale levels.

Step 130 then follows, at which system 120 adds up the total of corresponding numbers of pixels for each gray-scale level at or above the ideal threshold level I. The resulting sum n can be expressed mathematically as $$n = \sum_{k=I}^{U} Pix(k),$$

where I is the ideal threshold level, U is the uppermost gray-scale level of the histogram (i.e., the highest gray-scale level having at least one pixel), and Pix(k) is the respective number of pixels for the kth gray-scale level of the histogram.

This sum may be considered to be an estimate of the total number of "white" pixels, which are the pixels making up the characters of the representation 14' of the identification code 14. This number n of "white" pixels can also be thought of as the area of the histogram within a range $P_1$ (FIG. 6A) starting with the ideal threshold I and ending with the uppermost threshold level U. (Note that in FIGS. 6A and 6B the vertical scale in the "tail" portion of the histograms has been exaggerated to allow clearer illustration.)

The routine proceeds next to step 132, at which it is determined whether there are wafers in the test set which have yet to be processed. If so, the process described above with respect to steps 110–130 is performed for each of the remaining wafers. When this is complete, the routine proceeds to step 134, at which a parameter N is calculated as the arithmetic mean of the parameters n obtained for each of the wafers in the test set. The parameter N can be considered to be an estimated average number of the pixels which represent the i.d. code 14 (that is, the "white" pixels).

Step 136 follows in which a "centroid" (or average "white") gray-scale level CNT is calculated for each of the wafers in the test set on the basis of the parameter N. Step 136 will be described with reference to FIG. 6B. Before the centroid CNT is calculated, an upper range P2 of the histogram is established as the part of the histogram consisting of the uppermost gray-scale levels having a sum of the numbers of respective pixels that is greater than or equal to the parameter N. The lowest gray-scale level of this range will be referred to 23 as level ST, and can be expressed as:

$$ST = \text{the maximum value of } j \text{ for which } \sum_{k=j}^{U} Pix(k) \text{ is greater than or equal to } N,$$

where U is the uppermost gray-scale level of the histogram and Pix(k) is the respective number of pixels for the kth gray-scale level of the histogram. The centroid gray-scale level CNT is calculated as a weighted average of the gray-scale levels in this range $P_2$ using the following formula:

$$CNT = \frac{\sum_{k=ST}^{127} (k)(Pix(k))}{N}$$

The value of the centroid CNT for each wafer can be thought of as the average gray-scale level of the N "whitest" pixels in the image of the wafer.

After each centroid CNT is calculated (or alternatively after all of the centroids are calculated) the routine proceeds to step 138, at which a parameter k is calculated for each of the wafers according to the following formula: k=CNT/I. That is, k is the ratio of the centroid gray-scale level for the wafer to the ideal threshold level for the wafer. After all of the k values are calculated for the wafers, the system calculates at step 140 a parameter K as the arithmetic mean of the piece parameters k. Then the parameters N and K are established as pixel-discrimination threshold setting parameters to be used for the wafers that were not included in the test set.

Figure 8:
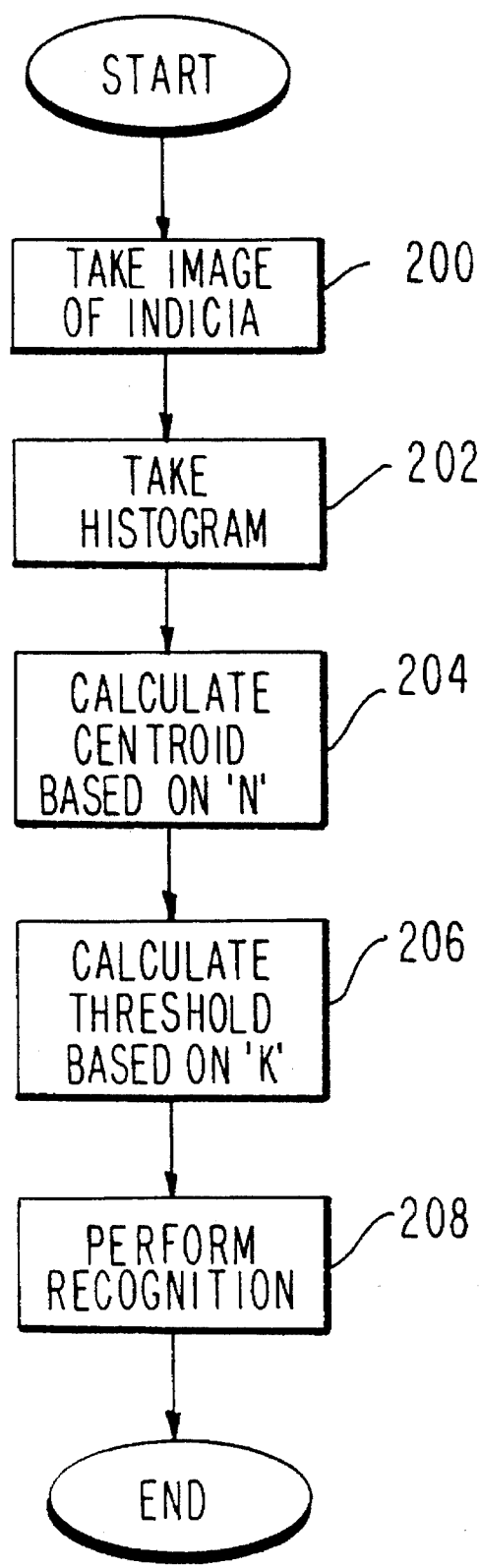
FIG. 8 is a flow chart of a pixel-discrimination threshold setting procedure in accordance with the present invention.

Referring now to FIG. 8, the use of these threshold-setting parameters N and K for setting pixel-discrimination thresholds for wafers not in the test set will be described. The procedure of FIG. 8 begins with step 200, at which an image 32 is formed with respect to a wafer that was not part of the test set. Next, at step 202, a histogram is taken of the image within the frame 36. Based on this histogram and the threshold setting parameter N, a centroid or average gray-scale level of what are assumed to be "white" pixels is calculated (step 204) in the same manner as was discussed with respect to step 136. The first or starting level of the range over which the centroid is calculated will be referred to, for the purposes of step 204, as gray-scale level "ST1" which is calculated according to the following formula:

$$ST1 = \text{the maximum value of } m \text{ for which } \sum_{k=m}^{U1} Pix(k)$$

is greater than or equal to N, where U1 is the uppermost gray-scale level of the histogram and Pix(k) and N are as previously defined.

The centroid CNT is calculated using the same weighted average formula given above, and then, in step 206, a pixel-discrimination threshold for the wafer is calculated simply by dividing the centroid gray-scale level CNT by the threshold-setting parameter K, with rounding to provide an integral gray-scale threshold level. The routine then proceeds to perform recognition (step 208) using the pixel-discrimination threshold level calculated at step 206.

The following Tables 1–3 show results obtained by carrying out the procedures of FIG. 7 for a number of test sets.

TABLE 1

| ID | low | high | ideal | cntr | k | thrsh | change | id_pix | pix_thres | pix_chg |
|---|---|---|---|---|---|---|---|---|---|---|
| 1ISD00Q69013 | 21 | 55 | 38 | 66 | 1.74 | 37 | −1 | 3400 | 39 | 1 |
| 1ISD00Q69004 | 12 | 29 | 20 | 31 | 1.55 | 17 | −3 | 3250 | 19 | −1 |
| 1ISD00Q69001 | 18 | 74 | 46 | 77 | 1.67 | 43 | −3 | 3218 | 44 | −2 |
| 1IPD00Q69076 | 31 | 71 | 51 | 99 | 1.94 | 55 | 4 | 3596 | 56 | 5 |
| 1IPD00Q69082 | 25 | 79 | 52 | 90 | 1.73 | 50 | −2 | 3487 | 55 | 3 |
| 1IPD00Q69079 | 14 | 37 | 25 | 43 | 1.72 | 24 | −1 | 3451 | 26 | 1 |
| 1IPD00Q69094 | 23 | 56 | 39 | 60 | 1.54 | 33 | −6 | 3057 | 34 | −5 |
| 1IPD00Q69088 | 17 | 74 | 45 | 93 | 2.07 | 52 | 7 | 3762 | 58 | 13 |
| 1IPD00Q69091 | 20 | 81 | 50 | 80 | 1.60 | 45 | −5 | 3053 | 44 | −6 |
| 1IPD00Q69103 | 16 | 85 | 50 | 90 | 1.80 | 50 | 0 | 3359 | 50 | 0 |
| 1IPD00Q69097 | 23 | 76 | 49 | 90 | 1.84 | 50 | 1 | 3445 | 51 | 2 |
| 1IPD00Q69100 | 14 | 52 | 33 | 57 | 1.73 | 32 | −1 | 3555 | 36 | 3 |
| 1IPD00Q69106 | 17 | 99 | 58 | 90 | 1.55 | 50 | −8 | 3042 | 51 | −7 |
| 1IPD00Q69109 | 14 | 43 | 28 | 57 | 2.04 | 32 | 4 | 3637 | 32 | 4 |
| 1IPD00Q69112 | 19 | 67 | 43 | 89 | 2.07 | 50 | 7 | 3565 | 48 | 5 |

N = 33.91

TABLE 1-continued

| ID | low | high | ideal | cntr | k | thrsh | change | id_pix | pix_thres | pix_chg |
|---|---|---|---|---|---|---|---|---|---|---|

K = 1.77
sigma_cnt = 1.12
sigma_pix = 1.29

TABLE 2

| ID | low | high | ideal | cntr | k | thrsh | change | id_pix | pix_thres | pix_chg |
|---|---|---|---|---|---|---|---|---|---|---|
| 1IPD00Q69001 | 27 | 99 | 63 | 103 | 1.63 | 58 | −5 | 3359 | 63 | 0 |
| 1IPD00Q69073 | 18 | 82 | 50 | 85 | 1.70 | 48 | −2 | 3182 | 46 | −4 |
| 1IPD00Q69052 | 17 | 67 | 42 | 85 | 2.02 | 48 | 6 | 3511 | 45 | 3 |
| 1IPD00Q69058 | 25 | 76 | 50 | 88 | 1.76 | 50 | 0 | 3593 | 56 | 6 |
| 1IPD00Q69028 | 18 | 62 | 40 | 86 | 2.15 | 49 | 9 | 3753 | 48 | 8 |
| 1IPD00Q69025 | 16 | 37 | 26 | 43 | 1.65 | 24 | −2 | 3290 | 26 | 0 |
| 1IPD00Q69010 | 14 | 41 | 27 | 45 | 1.67 | 25 | −2 | 3317 | 27 | 0 |
| 1ISD00Q69013 | 21 | 58 | 39 | 61 | 1.56 | 34 | −5 | 3136 | 35 | −4 |
| 1ISD00Q69010 | 13 | 33 | 23 | 41 | 1.78 | 23 | 0 | 3625 | 26 | 3 |
| 1ISD00Q69001 | 18 | 73 | 45 | 70 | 1.56 | 40 | −5 | 3006 | 40 | −5 |

N = 33.91
K = 1.77
sigma_cnt = 1.12
sigma_pix = 1.29

TABLE 3

| ID | low | high | ideal | cntr | k | thrsh | change | id_pix | pix_thres | pix_chg |
|---|---|---|---|---|---|---|---|---|---|---|
| 1IPD00Q69076 | 35 | 114 | 74 | 115 | 1.55 | 70 | −4 | 3356 | 71 | −3 |
| 1IPD00Q69079 | 15 | 65 | 40 | 64 | 1.60 | 39 | −1 | 3230 | 36 | −4 |
| 1IPD00Q69082 | 24 | 108 | 66 | 111 | 1.68 | 67 | 1 | 3624 | 73 | 7 |
| 1IPD00Q69088 | 19 | 95 | 57 | 116 | 2.04 | 70 | 13 | 4080 | 80 | 23 |
| 1IPD00Q69091 | 29 | 111 | 70 | 108 | 1.54 | 65 | −5 | 3321 | 67 | −3 |
| 1IPD00Q69094 | 24 | 84 | 54 | 83 | 1.54 | 50 | −4 | 3106 | 47 | −7 |
| 1IPD00Q69097 | 38 | 97 | 67 | 112 | 1.67 | 68 | 1 | 3498 | 71 | 4 |
| 1ISD00Q69100 | 19 | 79 | 49 | 181 | 1.65 | 49 | 0 | 3311 | 48 | −1 |
| 1ISD00Q69103 | 19 | 117 | 68 | 109 | 1.60 | 66 | −2 | 3326 | 66 | −2 |
| 1ISD00Q69106 | 29 | 119 | 74 | 111 | 1.50 | 67 | −7 | 33286 | 70 | −4 |

N = 33.91
K = 1.77
sigma_cnt = 1.12
sigma_pix = 1.29

In each of these tables, "low" and "high" represent respectively the lowest and highest gray-scale levels of the "successful" range of test threshold levels (i.e., "L" and "H" of FIGS. 5A and 5B), while "ideal" is the "ideal threshold level" I obtained by averaging L and H. "cntr" is the centroid gray-scale scale level CNT obtained according to step 136, and "k" is the piece parameter calculated as the ratio of the centroid CNT to the ideal threshold level I. "thrsh" is the pixel-discrimination threshold level calculated according to steps 200–206 (i.e., "cntr" divided by K). "change" is "thrsh" minus "ideal" and "id_pix" is the value of the parameter n for each of the wafers. Also shown are the values N and K (respectively the means of the piece parameters n and k) for the respective test sets. "sigma_cnt" is the standard deviation of the values of "thrsh" from the ideal thresholds "ideal" (I). Further, the values "pix_thres" are the values that would be obtained for the starting level ST1 of the range $P_2$ by applying step 204 to each of the wafers in the test set. It should be noted, as will be discussed in more detail, that this value ST1 can also be taken as an approximation of an ideal threshold level and so can be used as an alternative pixel-discrimination level. "Pix_chg" is "pix_thres" minus "ideal" and "sigma_pix" is the standard deviation of "pix_thres" from the ideal threshold levels.

As indicated above, a simplified approach to the pixel-discrimination threshold setting procedure described above dispenses with the threshold-setting parameter K and the piece parameters k. According to this simplified approach, steps 136–140 (FIG. 7) are omitted and step 142 consists only of setting N as the threshold-setting parameter. Moreover, in FIG. 8, step 206 is omitted and step 204 ends when the gray-scale level ST1 has been found. This level ST1 is then used as the pixel-discrimination threshold level. In other words, the initialization procedure is used only to obtain an estimated average number of "white" pixels which make up the characters in the i.d. code.

According to an alternative simplified approach, the test set is used to obtain an average centroid-to-ideal-threshold parameter K on the basis of an a priori estimate of the number of white pixels N. In this case, steps 130 and 134 of FIG. 7 are omitted, with N having been established as a parameter input by the operator, preferably as a result of previous testing or experience. It has been found that values of N in the range of 2000 to 5000 provide satisfactory results. However, the best results have been obtained by establishing N and K using the initialization procedure of FIG. 7 and by using both of these threshold-setting parameters to establish the pixel-discrimination thresholds for each of the wafers not in the test set.

Although the embodiments herein described have referred to semiconductor wafers as the work-pieces to be recognized, it should be understood that the procedures described herein can be applied to many different types of work-pieces and are particularly useful in recognizing codes or other information on highly reflective work-pieces such as compact disks.

It should also be understood that the features on the work-piece which are to be recognized are not limited to identification codes in the form of alphanumeric characters, but may also include other alphanumeric information, bar codes, geometric shapes, or other features that can be machine-recognized. A particular advantage of this system and method is its ability to facilitate recognition of indicia or other features which are not in sharp contrast with a background.

Having described a specific preferred embodiment of the present invention with reference to the accompanying drawings, it is to be understood that the invention is not limited to that precise embodiment, and that various changes and modifications may be effected therein by one skilled in the art without departing from the scope or spirit of the invention as defined in the appended claims. As used in the appended claims, "piece parameter" should be understood to include a parameter n or a parameter k as previously described.

What is claimed:

1. A method of setting a pixel-discrimination threshold level for a machine vision system. adapted to recognize indicia on a work-piece, comprising the steps of:

selecting a test group of work-pieces, each of said work-pieces having indicia to be recognized by said machine vision system;

imaging indicia on each work piece of said test group of work-pieces;

setting a plurality of test threshold levels for each work-piece of said test group of work-pieces;

attempting to recognize said indicia on each work-piece using the plural test threshold levels;

determining which of the plural test threshold levels provide acceptable indicia recognition;

calculating at least one threshold-setting parameter for said test group of work-pieces based on said determining step; and establishing a pixel-discrimination threshold level for a work-piece not included in said test group based on a characteristic of an image of said work-piece not included in said test group and said at least one threshold-setting parameter.

2. A method according to claim 1, wherein said at least one threshold-setting parameter is calculated based on an estimated average number of pixels from the determination of those test threshold levels which provide acceptable indicia recognition.

3. A method according to claim 2, wherein said at least one threshold-setting parameter is calculated based on an estimated average gray-scale level of said estimated average number of pixels.

4. A machine vision system adapted to recognize indicia on a work-piece, comprising:

means for imaging indicia on each work-piece of a test group of work-pieces;

means for setting a plurality of test threshold levels for each work-piece of said test group of work-pieces;

means for attempting to recognize said indicia on each work-piece using the plural test threshold levels;

means for determining which of the plural test threshold levels provide acceptable indicia recognition;

means for calculating at least one threshold-setting parameter for said test group of work pieces based on the plural test threshold levels determined to provide acceptable indicia recognition by said means for determining; and means for establishing a pixel-discrimination threshold level for a work-piece not included in said test group based on a characteristic of an image of said work-piece not included in said test group and said at least one threshold-setting parameter.

5. A method of setting a pixel-discrimination threshold level for a machine vision system adapted to recognize indicia. On a work-piece, comprising the steps of:

selecting a test group of work-pieces, each of said work-pieces having indicia to be recognized by said machine vision system;

establishing a range of gray-scale levels as test threshold levels;

for each work-piece of said test group:

forming an image of at least a portion of said work-piece so that said image includes a representation of said indicia, said image having a plurality of gray-scale levels;

attempting to recognize said indicia by means of said vision system using each of said test threshold levels as a pixel-discrimination threshold for said image;

entering into said system data representing actual indicia of said work-piece;

determining for each of said test threshold levels whether said vision system correctly recognized the indicia on said work-piece;

establishing a subrange of said test threshold levels that includes only those of said test threshold levels at which said system correctly recognized said indicia;

selecting a central threshold level of said subrange as an ideal threshold level for said work-piece; and calculating a piece parameter based on said ideal threshold level; and calculating a threshold-setting parameter for said test group of work-pieces based on the calculated piece parameters.

6. A method according to claim 5, further comprising the steps of:

selecting a work-piece not included in said test group, the selected work-piece not included in said test group having indicia to be recognized by said vision system;

forming an image of at least a portion of said selected work-piece not included in said test group so that said image includes a representation of said indicia, said image having a plurality of gray-scale levels;

taking a histogram of said image, said histogram including a representation of a respective number of pixels for each gray-scale level of said image; and setting a pixel discrimination threshold level for said selected work-piece not included in said test group based on said histogram and said threshold-setting parameter.

7. A method according to claim 5, wherein said step of calculating said threshold-setting parameter comprises calculating an average of the piece parameters calculated for said test group of work-pieces.

8. A method according to claim 5, wherein said step of calculating said piece parameter comprises the steps of:

taking a histogram of said image of each work-piece of said test group, said histogram including a representation of a respective number of pixels for each gray-scale level of said image;

defining an upper portion of said histogram, said upper portion including and extending upwardly from said ideal threshold level; and establishing said piece parameter as the sum of the number of pixels for each gray scale level of said histogram from said ideal threshold level to the uppermost gray scale level of said upper portion of said histogram.

9. A method according to claim 5, wherein said step of calculating said piece parameter comprises the steps of:

taking a histogram of said image of each work-piece of said test group, said histogram including a representation of a respective number of pixels for each gray-scale level of said image;

defining an upper portion of said histogram, said upper portion including and extending upwardly from a first gray-scale level to an uppermost gray scale level of said histogram, said upper portion including the number of pixels greater than or equal to said threshold setting parameter;

calculating a centroid gray-scale level of said upper portion as a weighted average of all gray-scale levels in said upper portion; and establishing said piece parameter as the ratio of said centroid gray-scale level to said ideal threshold level.

10. A method according to claim 5, wherein said indicia is an identification code for said work-piece.

11. A method according to claim 10, wherein said indicia has been laser-etched on a surface of said work-piece.

12. A method according to claim 11, wherein the work-pieces are semiconductor wafers having a reflective surface.

13. A method according to claim 10, wherein the work-pieces are compact disks.

14. A method according to claim 5, wherein said test threshold levels include 128 gray-scale levels.

15. A method of setting a pixel-discrimination threshold level for a machine vision system adapted to recognize indicia on a work-piece, comprising the steps of:

selecting a test group of work-pieces, each of said work-pieces having indicia to be recognized by said machine vision system;

establishing a range of gray-scale levels as test threshold levels;

for each work-piece of said test group:
forming an image of at least a portion of said work-piece so that said image includes a representation of said indicia, said image having a plurality of gray-scale levels;
attempting to recognize said indicia by means of said vision system using each of said test threshold levels as a pixel-discrimination threshold for said image;
entering into said system data representing actual indicia of said work-piece;
determining for each of said test threshold levels whether said system correctly recognized the indicia on said work-piece;
establishing a subrange of said test threshold levels that includes only those of said test threshold levels at which said vision system correctly recognized said indicia;
selecting a central threshold level of said subrange as an ideal threshold level; and
calculating a first piece parameter for each of the work-pieces based on said ideal threshold level;

calculating a first threshold-setting parameter for said test group of work-pieces based on the calculated first piece parameters;

calculating a second piece parameter for each of said work-pieces of said test group based on said first threshold-setting parameter and the respective ideal threshold level of said work-piece; and calculating a second threshold-setting parameter for said test group of work-pieces based on the calculated second piece parameters.

16. A method according to claim 15, further comprising the steps of:

selecting a work-piece not included in said test group, the selected work-piece not included in said test group having indicia to be recognized by said vision system;

forming an image of at least a portion of said selected work-piece not included in said test group so that said image includes a representation of said indicia, said image having a plurality of gray-scale levels;

taking a histogram of said image, said histogram including a representation of a respective number of pixels for each gray-scale level of said image; and setting a pixel-discrimination threshold level for said selected work-piece not included in said test group based on said histogram and said first and said second threshold-setting parameters.

17. A method according to claim 15, wherein:

said step of calculating said first piece parameter comprises the steps of:
taking a histogram of said image of each work piece of said test group, said histogram including a representation of a respective number of pixels for each gray-scale level of said image;
defining a first upper portion of said histogram, said first upper portion including and extending upwardly from said ideal threshold level; and
establishing said first piece parameter as the sum of the number of pixels for each gray scale level of said histogram from said ideal threshold level to an uppermost gray scale level of said upper portion of said histogram;

said step of calculating said first threshold-setting parameter comprises calculating an average of the first piece parameters for each of the work-pieces said step of calculating a second piece parameter for each work-piece of said test group comprises:
defining a second upper portion of said histogram for said work-piece of said test group, said second upper portion including and extending upwardly from a first gray-scale level to the uppermost gray scale level of said histogram, said upper portion including the number of pixels greater than or equal to said first threshold setting parameter;
calculating a centroid gray-scale level of said second upper portion as a weighted average of all gray-scale levels in said second upper portion; and
establishing said second piece parameter for each work-piece of said test group as the ratio of said centroid gray-scale level to the respective ideal threshold level of each work-piece of said test group; and said step of calculating said second threshold-setting parameter comprises calculating an average of said second piece parameters.

18. A method according to claim 17, further comprising the steps of:

selecting a work-piece not included in said test group, the selected work-piece not included in said test group having indicia to be recognized by said vision system;

forming an image of at least a portion of said selected work-piece not included in said test group so that said image includes a representation of said indicia, said image having a plurality of gray-scale levels;

taking a histogram of said image for each work piece of said test group, said histogram including a representation of a respective number of pixels for each gray-scale level of said image;

defining an upper portion of said histogram, said upper portion including and extending upwardly from a starting gray-scale level to the uppermost gray scale level of said histogram, said upper portion including the number of pixels greater than or equal to said first threshold setting parameter;

calculating a centroid gray-scale level of said upper portion as a weighted average of all gray-scale levels in said upper portion; and setting a pixel-discrimination threshold level for said selected work-piece not included in said test group based on said centroid gray-scale level and said second threshold-setting parameter.

19. A method according to claim 18, wherein said step of setting said pixel-discrimination threshold level for said work-piece not included in said test group comprises dividing said centroid gray-scale level of said work-piece not included in said test group by said second threshold-setting parameter.

20. A method according to claim 18, wherein said indicia are identification codes for the respective work-pieces.

21. A method according to claim 20, wherein said indicia have been laser-etched on a surface of the respective work-pieces.

22. A method according to claim 21, wherein said work-pieces are semiconductor wafers having a reflective surface.

23. A method according to claim 20, wherein said work-pieces are compact disks.

24. A method according to claim 20, wherein said test threshold levels include 128 gray-scale levels and each of said images has no more than 128 gray-scale levels.

25. A method according to claim 15, further comprising the steps of:

forming an image of at least a portion of one of said work-pieces so that said image includes a representation of the respective indicia of said work-piece, said image having a plurality of gray-scale levels;

taking a histogram of said image, said histogram including a representation of a respective number of pixels for each gray-scale level of the image;

examining said histogram to determine whether a lighting condition of said work-piece is satisfactory; and adjusting said lighting condition if said lighting condition is not satisfactory.

26. A machine vision system for recognizing respective indicia on work-pieces, comprising:

means for forming respective images of at least respective portions of said work-pieces, said respective images having a plurality of gray-scale levels and including respective representations of the indicia on said work-pieces; and analysis means for analyzing respective ones of said images, said analysis means comprising:

means for establishing a range of said gray-scale levels as test threshold levels;

means for attempting to recognize said indicia by using said test threshold levels as pixel-discrimination threshold levels for a respective image;

means for entering data representing respective indicia for each of said work-pieces;

means for determining at which of said test threshold levels said respective indicia are correctly recognized by said vision system;

means for selecting an ideal threshold level based on said test threshold levels at which said respective indicia are correctly recognized by said means for determining;

piece parameter means for calculating a piece parameter for each of said work-pieces based on said ideal threshold level; and threshold parameter means for calculating a threshold-setting parameter based on the piece parameters calculated for a plurality of said work-pieces.

27. A machine vision system according to claim 26, wherein said analysis means further comprises:

means for establishing a subrange of test threshold levels that includes only those test threshold levels at which said respective indicia was correctly recognized; and means for selecting a central threshold level of said subrange as said ideal threshold level for each of said work-pieces.

28. A machine vision system according to claim 26, wherein said analysis means further comprises histogram means for forming a histogram for each of said images, each histogram including a representation of a respective number of pixels for each gray-scale level of the respective image.

29. A machine vision system according to claim 28, wherein said analysis means further comprises means for setting a pixel-discrimination threshold level for each work-piece based on said threshold-setting parameter and said histogram for an image that includes a representation of indicia on said work-piece.

30. A machine vision system according to claim 28, wherein said piece parameter means comprises:

means for defining an upper portion of said histogram for each of said images, said upper portion including and extending upwardly from said ideal threshold level; and means for establishing said piece parameter as the sum of the number of pixels for each gray scale level of said histogram from said ideal threshold level to an uppermost gray scale level of said upper portion of said histogram.

31. A machine vision system according to claim 28, wherein said piece parameter means comprises:

means for defining an upper portion of said histogram for each of said images, said upper portion including and extending upwardly from a first gray-scale level to an uppermost gray scale level of said histogram, said upper portion including the number of pixels greater than or equal to said threshold setting parameter; and means for calculating a centroid gray-scale level of said upper portion as a weighted average of all gray-scale levels in said upper portion;

said piece parameter means establishing said piece parameter as the ratio of said centroid gray-scale level to said ideal threshold level.

32. A machine vision system according to claim 28, wherein:

said piece parameter means comprises:

means for defining a first upper portion of said histogram for each of said images, said first upper portion including and extending upwardly from said ideal threshold level; and means for establishing a first piece parameter as the sum of the number of pixels for each gray scale level of said histogram from said ideal threshold level to an uppermost gray scale level of said first upper portion of said histogram:

said threshold parameter means comprises means for calculating a first threshold-setting parameter based on the respective first piece parameters calculated for a plurality of said work-pieces;

said piece parameter means further comprises:

means for defining a second upper portion of said histogram for each of said images, said second upper portion including and extending upwardly from a first gray-scale level to the uppermost gray scale level of said histogram, said second upper portion including the number of pixels greater than or equal to said first threshold setting parameter; and means for calculating a centroid gray-scale level of said second upper portion as a weighted average of all gray-scale levels in said second upper portion;

said piece parameter means establishing a second piece parameter as the ratio of said centroid gray-scale level to said ideal threshold level;

said threshold parameter means further comprises means for calculating a second threshold setting parameter based on respective second piece parameters calculated for said plurality of said work-pieces; and said analysis means further comprises threshold means for setting a pixel-discrimination threshold level for a work-piece for which said piece parameters have not been calculated, said threshold means comprising:

means for defining an upper portion of said histogram that includes a representation of an indicia on said work-piece for which said piece parameters have not been calculated, said upper portion including and extending upwardly from a start gray-scale level to the uppermost gray scale level of said histogram, said upper portion including the number of pixels greater than or equal to said first threshold setting parameter;

means for calculating a centroid gray-scale level of said upper portion as a weighted average of all gray-scale levels in said upper portion; and means for dividing said centroid gray-scale level by said second threshold-setting parameter to produce said pixel-discrimination threshold for said work-piece for which said piece parameters have not been calculated.

33. A machine vision system according to claim 32, wherein said threshold parameter means calculates said first threshold-setting parameter by averaging said respective first piece parameters and calculates said second threshold-setting parameter by averaging said respective second piece parameters.

34. A machine vision system according to claim 28, further comprising illumination means for illuminating said work-pieces, said illumination means comprising means for adjusting an amount of light emitted by said illumination means so that said images of said work-pieces are satisfactory.

* * * * *